United States Patent [19]

Nix

[11] 4,001,064

[45] Jan. 4, 1977

[54] MANUAL STRAPPING TOOL

[75] Inventor: Robert J. Nix, Park Ridge, Ill.

[73] Assignee: Signode Corporation, Glenview, Ill.

[22] Filed: Sept. 3, 1975

[21] Appl. No.: 609,361

Related U.S. Application Data

[63] Continuation-in-part of Ser. No. 515,435, Oct. 21, 1974, abandoned.

[52] U.S. Cl. ............................. 156/73.6; 53/198 R; 156/268; 156/527; 156/530; 156/580; 228/2; 264/68
[51] Int. Cl.$^2$ .................. B32B 31/18; B32B 31/20
[58] Field of Search .......... 228/2; 264/68; 156/268, 156/527, 530, 73.6, 580; 53/198 R

[56] References Cited

UNITED STATES PATENTS

| | | | |
|---|---|---|---|
| 3,709,758 | 1/1973 | Gilmore | 156/580 |
| 3,799,835 | 3/1974 | Gilmore | 156/580 |

Primary Examiner—Edward G. Whitby
Attorney, Agent, or Firm—Dressler, Goldsmith, Clement, Gordon & Shore, Ltd.

[57] ABSTRACT

A manual strapping tool for joining overlapping portions of a thermoplastic strap includes a cantilevered spring having fixed and vibratory ends. The fixed end is rigidly anchored to a base member and the vibratory end supports one of a pair of jaws having opposing strap gripping surfaces. The other jaw is fixedly positioned on the base so that the strap gripping surfaces are normally in confronting engagement. An operating handle is pivotally mounted on the base member and swingable from a start position through a strap compressing position and a strap sealing position. In the start position, a lifter cam on the operating handle engages a lift arm causing the arm to raise the vibratory end of the cantilevered spring and to separate the strap gripping surfaces so that overlapping strap portions can be inserted therebetween. As the operating handle is swung from the start position to the strap compressing position, the lifter cam is disengaged from the lift arm releasing the vibratory end to compress the overlapping strap portions between the strap gripping surfaces. Further movement of the operating handle into the strap sealing position causes a triggering cam means on the operating handle to deflect and release the vibratory end so as to effect relative sliding frictional movement between the compressed overlapping strap portions and to melt the interface regions thereof. If desired, means for severing the strap end can also be provided on the vibratory end. Thereafter, the operating handle is swung back to the start position to release the strap from the tool.

19 Claims, 20 Drawing Figures

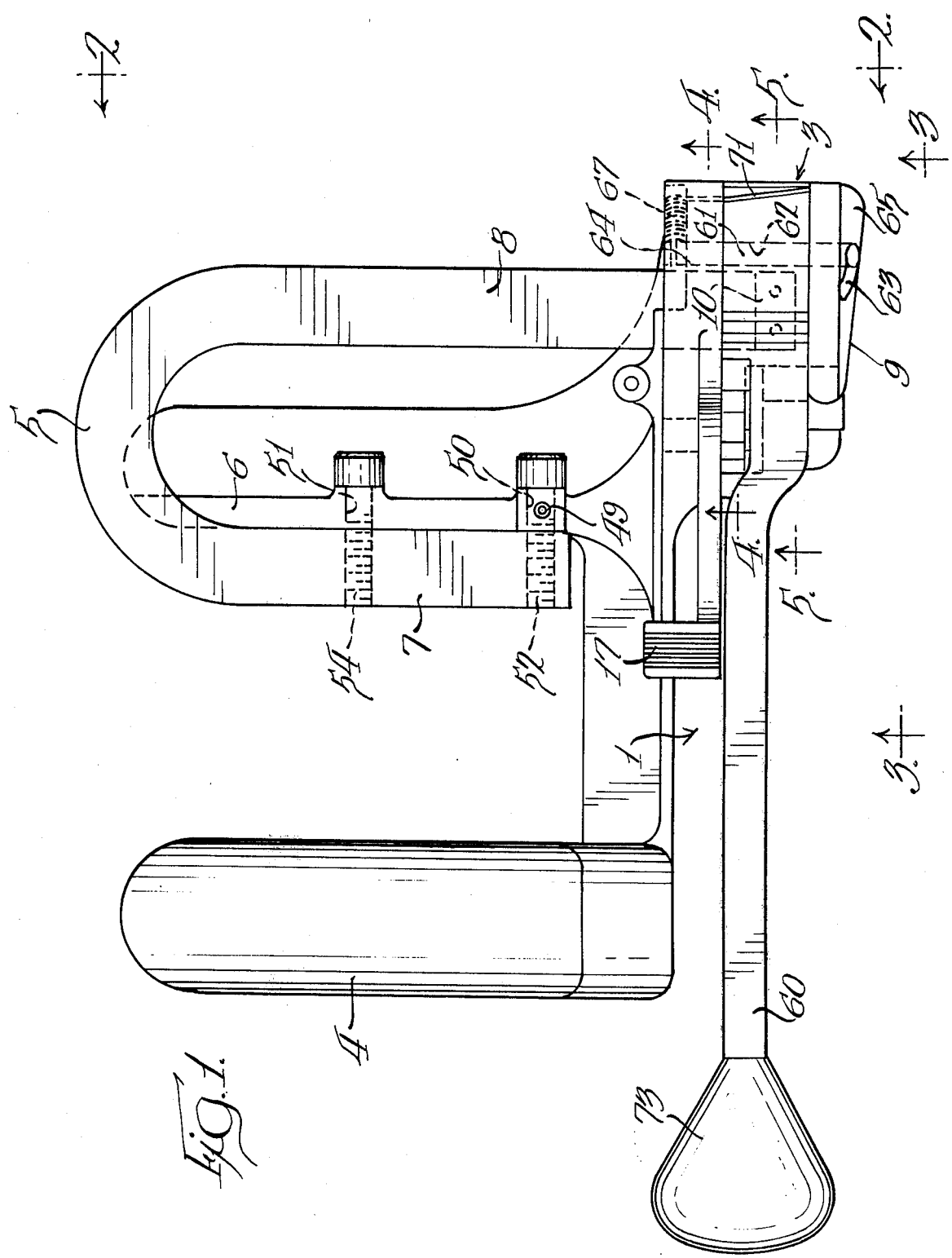

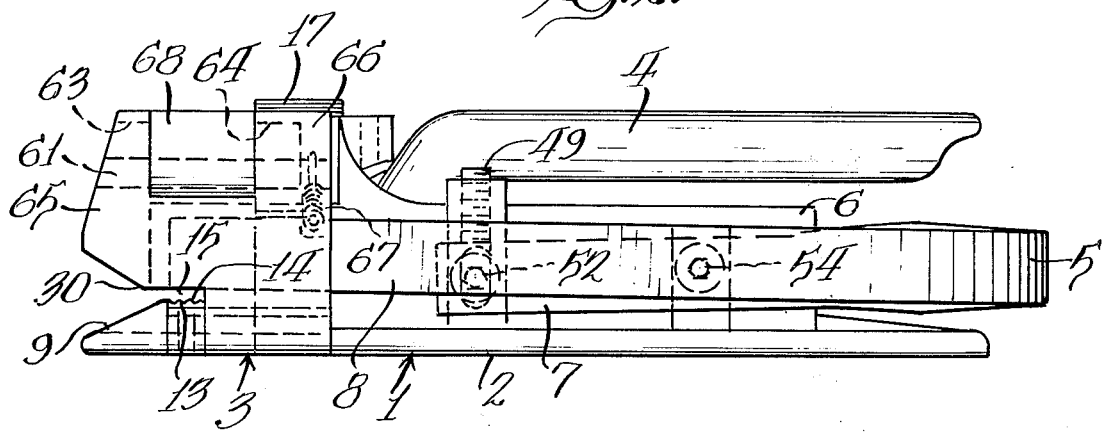
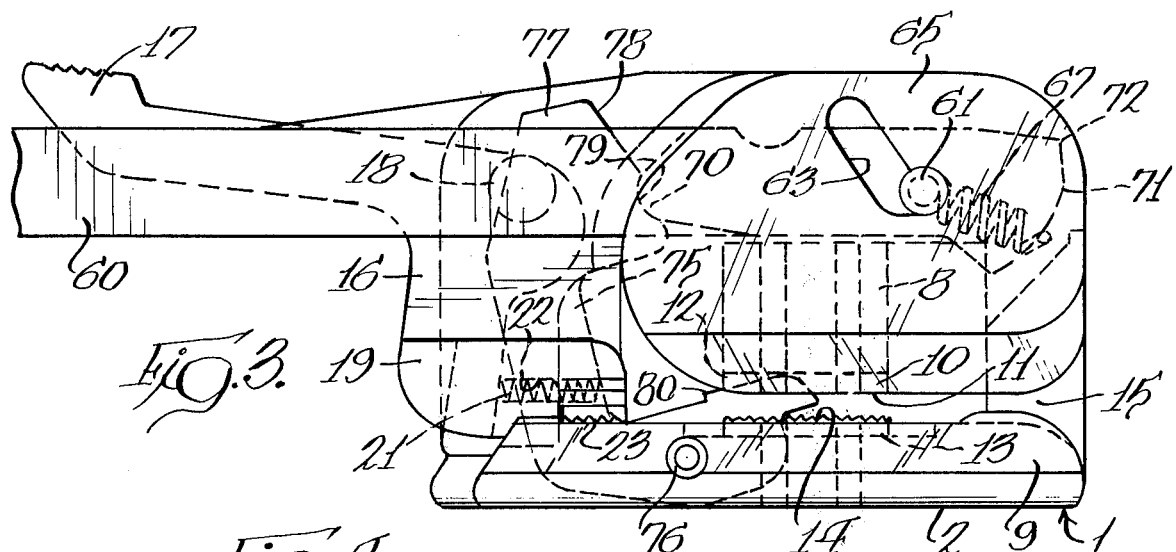
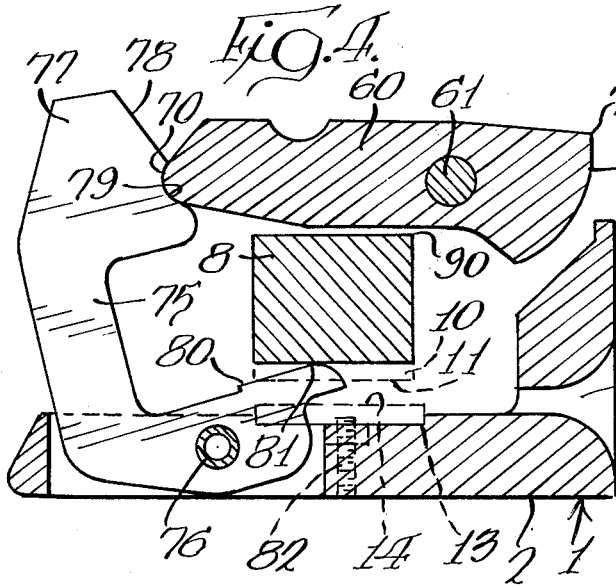
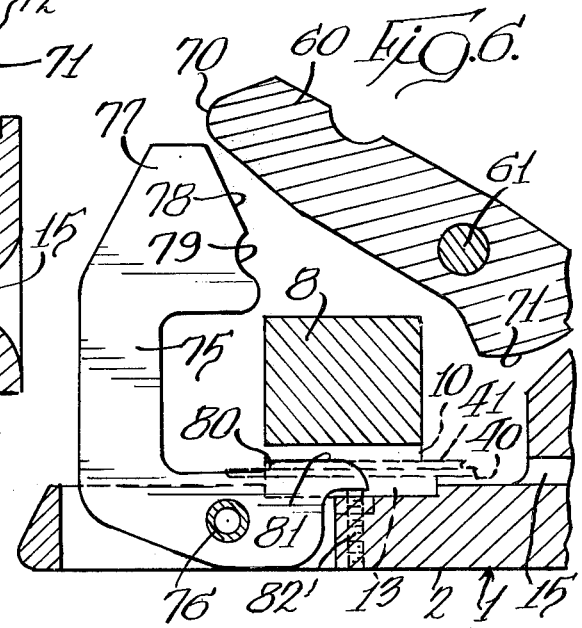

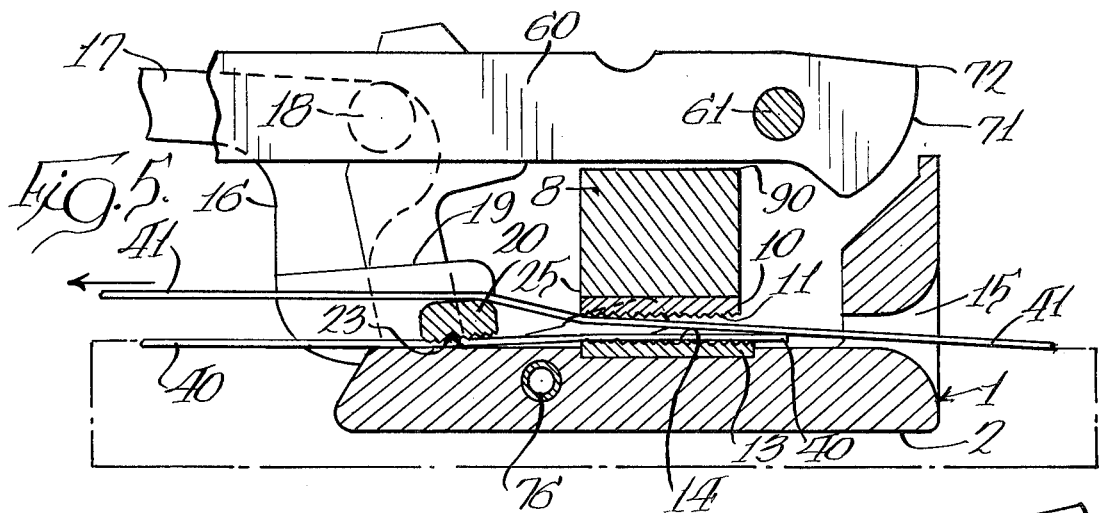
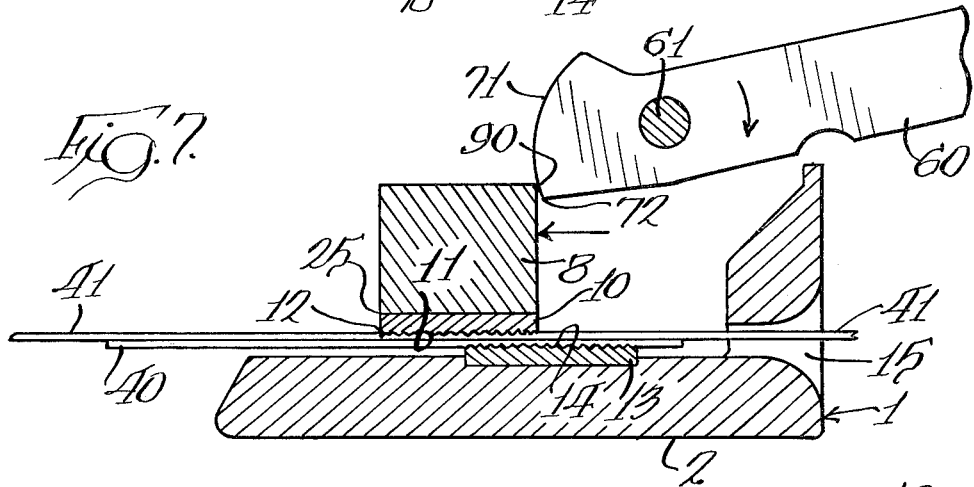
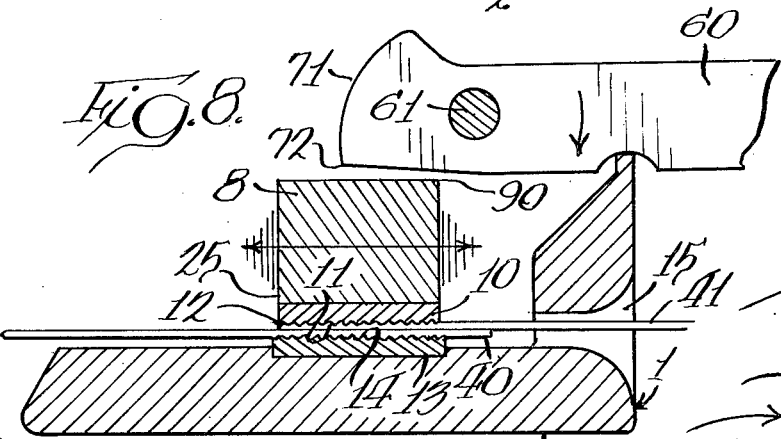
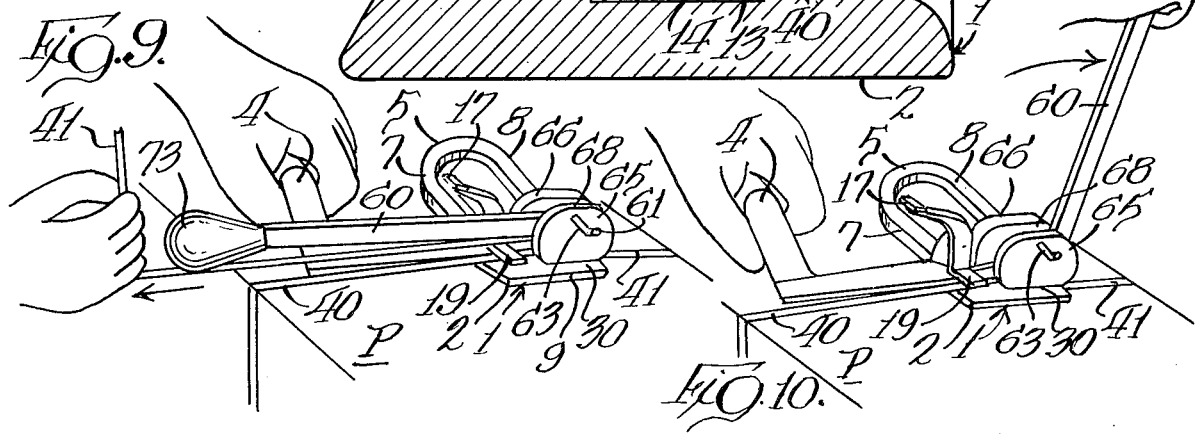

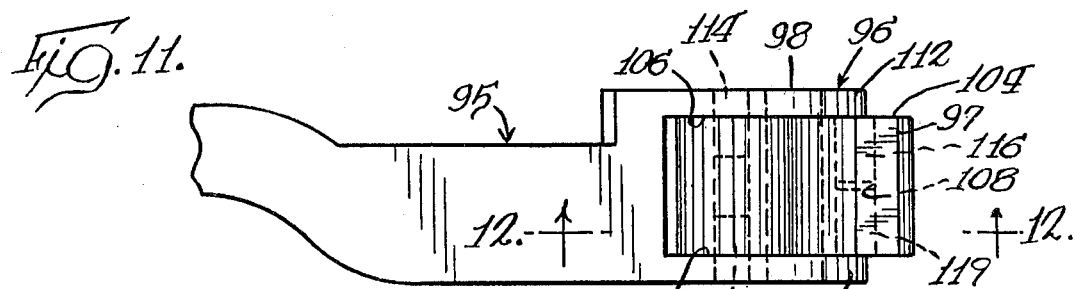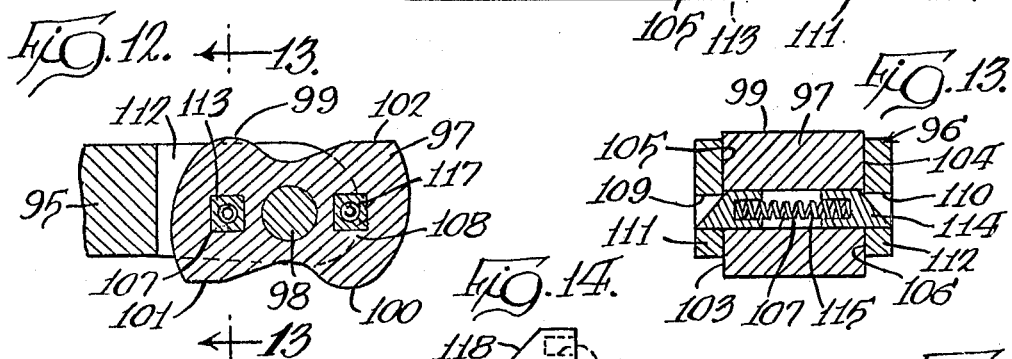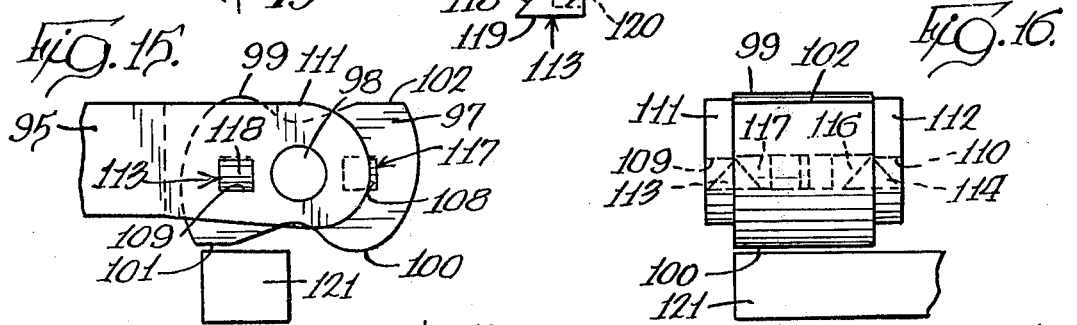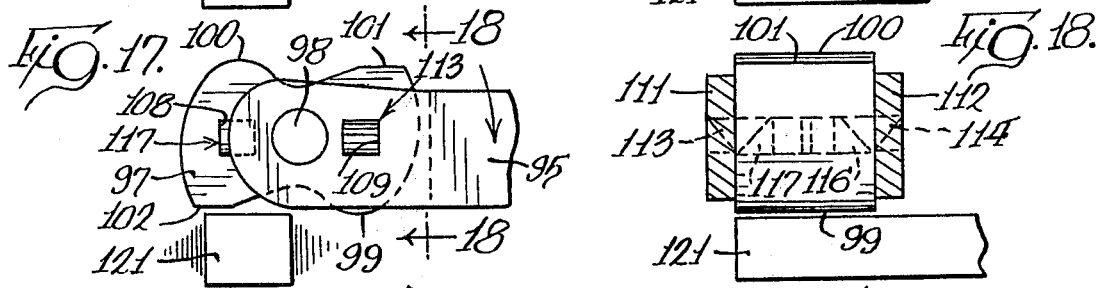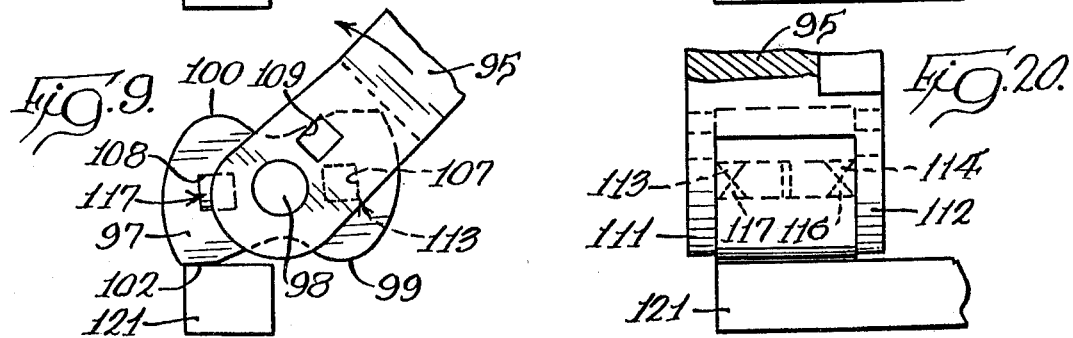

4,001,064

MANUAL STRAPPING TOOL

CROSS-REFERENCE TO RELATED APPLICATIONS

This application is a continuation-in-part of copending application Ser. No. 515,435, filed on Oct. 21, 1974 now abandoned.

BACKGROUND OF THE INVENTION

The present invention relates to manually operated self-contained strapping tools for joining overlapping portions of thermoplastic strap meterial by the friction-fusion technique.

Prior art strapping tool devices are commonly disclosed as being powered by pneumatic or electric motors. See U.S. Pat. No. 3,442,733 to Vilcins and U.S. Pat. No. 3,586,572 to Ericsson. It can be appreciated, however, that a need exists for a more versatile strapping tool that is completely self-contained for those situations where a suitable source of air or electricity is not available. Self-contained manual strapping tools have been developed, but have the drawback that a high energy input is needed for sealing in a single stroke. Such a manual strapping tool is illustrated in U.S. Pat. No. 3,442,734 to Ericsson and utilizes a floating gripper shoe which is driven by a coil-spring actuated cam. The coil spring is compressed by a power cylinder or a bell crank to initiate the sealing cycle.

Another self-contained manually operated strapping tool for receiving overlapping portions of thermoplastic strap formed into a loop about an article is disclosed in German Published Specification No. 1,923,907. This particular tool includes a movable jaw mounted on a rotatable eccentric that is spring loaded so as to bring the movable jaw in close proximity to an opposing fixed jaw. A locking mechanism is associated with the movable jaw to hold it in a position remote from the fixed jaw so that overlapping strap portions can be inserted and removed from between the jaws. An actuating lever is reciprocatingly cranked to drive a ratchet feed wheel unit to pull tension on the strap loop and at the same time to wind a driving spring to tension. With the loop under tension, the actuating lever is pivoted to release the spring loaded eccentric to bring the movable jaw close to the fixed jaw and compress the overlapping strap portions. The actuating lever is again pivoted to release the tensioned driving spring which acts to spin a driver shaft for a short period of time. A star wheel having arcuate portions positioned end-to-end around the circumference of the wheel is fixedly attached to the driver shaft and rotates as the shaft is spun. A rocker, positioned adjacent to the periphery of the star wheel, is oscillated back and forth by the arcuate surface portions of the star wheel as it is rotated. The movable jaw is coupled to the rocker so that it also oscillates causing the interface regions of the compressed overlapping strap portions to melt. A cutter mechanism is subsequently actuated by another handle to sever the upper strap from a supply strap. Thereafter, the actuating lever is pivoted to separate the jaws and release the strap from engagement by the tool.

The strapping tool disclosed in the foregoing publication constitutes a quite intricate and costly piece of equipment. Not all users of strapping tools have needs that wuld necessitate the expense of such a tool. Thus it is desirable to provide a less costly manual strapping tool that is completely portable, of lightweight, simple and compact design, and a tool that requires a relatively low energy input for effective sealing.

SUMMARY OF THE INVENTION

A self-contained manual strapping tool is disclosed suitable for tensioning and joining overlapping portions of a thermoplastic strap tensioned about an article. The tool comprises a base on which a fixed end of a cantilevered spring is anchored. In the illustrative embodiment that follows, the cantilevered spring is shown as a bar spring in a U-shaped configuration. However, other configurations of a cantilevered spring also can be used. A fixed gripper jaw is provided on the base, and a movable gripper jaw is provided on a vibratory end of the cantilevered spring in juxtaposition with the fixed gripper jaw. An operating handle having a lifter cam and a trigger cam means is pivotally mounted on the base. The operating handle is swingable about an arc from a start position sequentially through a strap compressing position and a strap sealing position. In the start position, the lifter cam on the handle engages a lift arm to release the jaws. The lift arm is pivotally mounted on the base and has a detent therein engageable by the lifter cam when the handle is in the start position to pivot the lift arm into engagement with the vibratory end and to raise it, thereby storing return energy in the spring. This action also separates the gripping surfaces. With the opposing gripping surfaces separated, the tool is in condition to receive thermoplastic strap material therebetween.

A rear gripper mechanism for use in tensioning the strap material about an article is also provided. An end of the strap material is clamped on the base by the rear gripper mechanism so that its end extends between the separated gripping surfaces. The strap material is then manually extended around the article and formed into a loop by feeding the material back into the tool over the underlying strap end clamped to the base, between the separated gripping surfaces, and out of the tool, extending directly under the operating handle. The loop is tensioned about the article manually by grasping a handle grip on the tool and pulling the top strap to draw it tight. While under the desired tension, the top strap is lifted up so as to engage the overlying operating handle and move the handle from the start position. This movement causes the lifter cam on the operating handle to disengage the detent in the lift arm which in turn releases the raised vibratory end which then moves downwardly to compress the overlapping strap portions between the gripping surfaces.

The operating handle is now swung further to the strap sealing position where a trigger cam means carried by the operating handle engages the vibratory end, deflecting it in a direction generally parallel to the strap-gripping surfaces and storing energy therein. After being deflected a predetermined distance, the trigger cam releases the vibratory end causing the movable jaw to oscillate relative to the fixed jaw. The gripping surfaces secure the adjacent strap portions to the respective jaws so that the oscillation causes sliding frictional movement between the compressed overlapping portions sufficient to melt the interface regions thereof. Because the cantilevered spring according to the present invention is fixed only at one end, damping of the vibratory end is limited.

After movement of the vibratory end stops, the melted interface regins resolidify to form a friction-fused joint between the overlapping strap portions. The top strap can be severed at the joint by a cutter blade provided on the gripping surface of the upper jaw while the overlapping portions are still compressed. The jaws are then released from about the overlapping strap portions by swinging the operating handle in the opposite direction to return it to the start position. In one embodiment the trigger cam means is integral with the operating handle and the handle is mounted on the base so that it can be raised to allow the trigger cam means to freely pass over the vibratory end on the return swing. In the start position the lifter cam again engages the detent in the lift arm pivoting it into engagement with the vibratory end thus raising the vibratory end and separating the gripping surfaces of the jaws.

In another embodiment, a rotatably-mounted cam member having a pair of substantially identical cam surfaces about 180 degrees apart is provided on the operating handle and serves as the trigger cam means. Each of the cam surfaces is adapted to engage and release the vibratory end of the cantilevered spring. The rotatably-mounted cam member is actuated by a pair of opposed pawls that engage the operating handle so as to rotate the cam member when the operating handle is pivoted from its start position to the strap sealing position but release the operating handle during return to the start position so that the cam member remains stationary.

Other features and advantages of the invention will be apparent from the following description and claims, and are illustrated in the accompanying drawings which show illustrative embodiments of the present invention.

BRIEF DESCRIPTION OF THE DRAWINGS

FIG. 1 is a top view showing the manual strapping tool according to the present invention;

FIG. 2 is a frontal view of the base member taken along plane 2—2 of FIG. 1 showing details of the base member;

FIG. 3 is a fragmentary side view taken along plane 3—3 of FIG. 1;

FIG. 4 is a cross-sectional view taken along plane 4—4 of FIG. 1 showing details of the lift arm and operating handle;

FIG. 5 is a cross-sectional view taken along plane 5—5 of FIG. 1 showing the separation of the jaw members by the lift arm;

FIGS. 6–8 are sequential views showing the strap tensioning and strap sealing positions of the operating handle starting from a handle position where the lifter cam means on the operating handle disengages the detent in the lift arm causing the movable jaw to compress the overlapping strap portions against the fixed jaw, through the deflection of the vibratory end of the U-shaped spring, through the release of the vibratory end and oscillation thereof to cause interface melting between the overlapping strap portions between the gripping surfaces;

FIGS. 9 and 10 are perspective views of the manual strapping tool during the strapping operation illustrating manual tensioning of a thermoplastic strap about an article and the subsequent manipulation of the operating handle to compress the overlapping strap portions between the jaws, through the deflection of the vibratory end to initiate interface melting between the compressed overlapping strap portions;

FIG. 11 is a fragmentary top view of an operating handle provided with a rotatably-mounted trigger cam member;

FIG. 12 is a sectional elevation taken along plane 12—12 in FIG. 11;

FIG. 13 is a sectional elevation taken along plane 13—13 in FIG. 12;

FIG. 14 is a side elevational view of a pawl which engages the operating handle;

FIG. 15 is a fragmentary side elevation showing an operating handle in the start position;

FIG. 16 is a fragmentary end elevation showing an operating handle in the start position;

FIG. 17 is a fragmentary side elevation showing an operating handle in the strap sealing position;

FIG. 18 is a fragmentary end elevation, partly in section, taken along plane 18—18 in FIG. 17;

FIG. 19 is a fragmentary side elevation showing an operating handle during return to the start position; and FIG. 20 is a fragmentary end elevation showing an operating handle during return to the start position.

DETAILED DESCRIPTION

Referring to the drawings, FIGS. 1–3 show top, front and side views of the manual strapping tool according to the present invention with a top cover (not shown) removed. The tool, which is adapted for use with thermoplastic strap material made of nylon, polypropylene, polyester, and the like, comprises a base 1 having a generally flat bottom 2 adapted to rest atop an article to be strapped. Looking from the top view (FIG. 1), the front of the tool is indicated generally at 3. Handle grip 4 is provided on the tool extending outwardly from the left side of base 1 for use in holding the tool stationary during the strapping operation, as will be discussed in greater detail below. Also extending outwardly from the left side of base 1 is a U-shaped bar spring member 5. Mounted on a bracket 6 in cantilever fashion, bar spring 5 is anchored to the base 1 at fixed end 7 and extends away from, then turns toward base 1 terminating in vibratory end 8. Attached to the end of vibratory end 8 is upper jaw member 10. As can be seen in FIG. 3, jaw member 10 is provided with downwardly facing strap-gripping surface 11. The rearward end of strap-gripping surface 11 is provided with optional strap cutter blade 12. Lower jaw member 13 is fixedly positioned on base 1 under upper jaw member 10 and has an upwardly facing complementary gripper surface 14 positioned directly opposite the downwardly facing gripper surface 11. Upwardly facing gripper surface 14 lies along the surface of strap guide 15 in base 1. Strap guide 15 runs along one side of base 1 and across a laterally-extending portion 9 thereof. Strap guide 15 is used for guiding strap material through the tool between the opposing gripping surfaces 11 and 14 of the jaws 10 and 13. One side of base 1 is slotted as indicated at 30 in FIG. 2 to allow access to strap guide 15 for insertion and removal of the strapping material from the tool. Included along the strap guide 15 is rear gripping mechanism 16 (FIG. 3) used during the strapping operation to clamp an end of the strap material to the tool as will be discussed in greater detail below. Gripping mechanism 16 includes control lever 17 which is pivotally mounted on base 1 by a pin 18. Lever 17 is connected to lower arm 19 which in turn supports gripping surface 20. Bias spring 21, nestled in bore 22 of base 1, is compressed against lower arm 19 pivoting control lever 17 upwardly and gripper surface 20 downwardly against a surface portion 23 along strap guide 15.

Fixed end 7 of the U-shaped bar spring member 5 is mounted to bracket 6 on base 1 at a slightly downward angle with the horizontal so that vibratory end 8 extends into laterally-extending portion 9 of base 1 at a downward angle. Bracket 6 extends outwardly from base 1 in a horizontal plane that is elevated with respect to the upwardly facing gripping surface 14 of jaw 13. As best seen in FIGS. 1 and 2, bracket 6 is provided with two spaced mounting holes 50 and 51. Hole 50, which is closest to base 1, is lower than hole 51 and is slotted. Fixed end 7 is fastened to bracket 6 by bolts 52 and 54 passing through the holes 50 and 51. Because of the uneven arrangement of the holes 50 and 51, the fixed end 7 and vibratory end 8 of the U-shaped bar spring 5 are made to extend downwardly at an acute angle towards laterally-extending portion 9 of base 1. The downward angle is sufficient to bring the gripping surface 11 of jaw 10 attached to vibratory end 8 into engagement or near-engagement with gripping surface 14 and exert a normal force thereon when strap material is positioned between gripping surfaces 11 and 14. The amount of normal force exerted on the gripping surface 14 can be varied by adjusting the bolt 52 in the slotted hole 50 upward or downward by means of adjusting screw 49 thereby decreasing or increasing the downward projection of vibratory end 8.

Movement of the jaw member 10 with respect to jaw member 13 is controlled by an operating handle 60. Pivotally mounted in a yoke 68 projecting from base 1 by a pin 61, the operating handle 60 is swingable about an arc through a sequence of positions to effect different movement of vibratory end 8 carrying upward jaw member 10. Referring to FIG. 3, the operating handle 60 includes an elongated lever pivotally mounted at one end to base 1 by pin 61 that passes transversely through aperture 62 in the handle body. The ends of pin 61 are supported in slotted apertures 63 and 64 in the spaced upright wall portions 65 and 66 of yoke 68. Spring 67 is attached between pin 61 and to base 1 under tension to maintain the pin 61 in the bottom of the slots 63 and 64. Positioned on the handle surface near the pivot point is lifter or detent cam 70 and cocking trigger cam 71. Lifter cam 70 is positioned on one side of pin 61 and trigger cam 71, which comprises the very end surface of handle 60, is positioned on the other side of pin 61. Operating handle 60 is positioned on base 1 substantially overhead and in line with strap guide 15.

Operating handle 60 is swingable on an arc about the pin 61 from a start position (shown in FIGS. 4 and 5), through a strap compressing position (shown in FIG. 6), and to a strap sealing position (shown in FIGS. 7 and 8). Turning to FIGS. 4 and 5, operating handle 60 is shown in a position whereby the tool is in condition to receive, between the separated jaw members 10 and 13, overlapping portions 40 and 41 of strap material tensioned about an article. As discussed above, gripping surfaces 11 and 14 of jaw members 10 and 13 are normally in engagement under a substantially normal force exerted by the downwardly extending vibratory end 8 of the U-shaped bar spring 5. In the start position of handle 60, however, lifter or detent cam 70 acts against a lift arm 75 causing it to engage the downwardly extending vibratory end 8 and raise it thereby storing return energy in the U-shaped spring 5. This, in turn, causes jaw member 10 to be raised separating the gripping surface 11 from the gripping surface 14. In FIGS. 4 and 5, lift arm 75 is shown as being substantially L-shaped and pivotally mounted at its apex to the base 1 by a pin 76. Upper end 77 of lift arm 75 presents slanting surface 78 with a detent or recess 79 therein adapted to be engaged by lifter or detent cam 70 on handle 60 when in the start position. Cam 70 forces lift arm 75 to pivot counterclockwise, as shown in FIGS. 4 and 5, about the pin 76 causing the lower end 80 of lift arm 75 to rise upwardly and engage vibratory end 8 along flat upper surface portion 81. Set screw 82 in base 1 provides means for adjusting the height of lower end 80 when lifter cam 70 is not engaged by detent 79 so that gripper jaws 11 and 14 can be prevented from touching one another when there is no strap therebetween. When lifter cam 70 is engaged by detent 79, lift arm 75 is locked in the position shown mantaining the vibratory end 8 raised and gripping surfaces 11 and 14 separated. Overlapping portions 40 and 41 of thermoplastic strap material can now be positioned between the jaw members 10 and 13.

Referring to FIG. 6, pivoting of the operating handle 60 upwardly from the start position about pin 61 causes the overlapping strap portions 40 and 41 to be compressed against one another. The upwardly movement of handle 60 disengages lifter cam 70 from detent 79. This removes the reaction force on lift arm 75 that holds the vibratory end 8 raised and the gripping surfaces 11 and 14 separated against the urging of bar spring 5. Return energy stored in the U-shaped bar spring 5 when surfaces 11 and 14 were separated moves vibratory end 8 downwardly, pushing lower end 80 of lift arm 75 as it goes. This causes upper end 77 of lift arm 75 to pivot clockwise about pin 76, as shown in FIG. 6. Movable jaw member 10 attached to vibratory end 8 moves down applying a normal force to the overlapping portions 40 and 41 lying between the opposing gripping surfaces 11 and 14 compressing and holding them in a clamping engagement.

Further pivoting of operating handle 60 through an arc about pin 61 brings it into the strap sealing position where the cocking trigger cam 71 on the end of the operating handle 60 comes into engagement with the upper right corner 90 of vibratory end 8 as viewed in FIG. 7. The outer surface of trigger cam 71 is preferably at an angle with respect to the longitudinal axis of handle 60 so as to provide substantially line contact between trigger cam 71 and vibratory end 8 as vibratory end 8 is deflected rearwardly by trigger cam 71. This is illustrated in FIG. 1. This arrangement provides line contact between the surface of trigger cam 71 and the upper right hand corner 90 of vibratory end 8 during deflection and minimizes wear on the contact surfaces. Alternatively, the surface of trigger cam 71 may be substantially perpendicular with the longitudinal extent of handle 60 and the upper right hand corner 90 of vibratory end 8 can be angled so as to provide line contact between the two.

Continued movement of operating handle 60 forces trigger cam 71 against upper right corner 90 slowly deflecting the vibratory end 8 in a direction substantially parallel to strap-gripping surfaces 11 and 14. Surface curvature of trigger cam 71 can be varied in order to deflect or displace vibratory end 8 a predetermined distance which will store the required amount of sealing energy in U-shaped bar spring 5. Deflection of the vibratory end 8 also causes upper jaw 10 to move.

With the gripping surfaces 10 and 11 engaging the respective adjacent overlapping strap portions 40 and 41, during deflection, top strap 41 slides over underlying strap 40, but at such slow speed that no interface friction melting occurs.

As trailing edge 72 of trigger cam 71 passes above the upper right hand corner 90, vibratory end 8 is released. The energy store in the U-shaped bar spring 5 during the deflection causes upper jaw 10 to oscillate at relatively high speed back and forth over lower jaw 13. The back-and-forth movement is substantially linear but at times can approach a substantially figure-eight pattern. Gripping surfaces 11 and 14 maintain the adjacent overlapping strap portions 40 and 41 secured to jaws 10 and 13 so that the relative oscillation of the jaws with respect to each other under compression effects sliding frictional movement between the overlapping strap portions received and held therebetween. The amount of energy stored in U-shaped spring 5 powers upper jaw 10 through a sufficient number of oscillatory reversals of diminishing amplitude to cause the interface regions of the compressed, overlapping strap portions 40 and 41 to melt. After upper jaw 10 stops moving, the melted interface regions resolidify rapidly, usually in less than a second, to form a strong friction-fused joint between the overlapping strap portions 40 and 41.

In a specific example of the present invention using ¼ in. polypropylene thermoplastic strap material, the overlapping portions 40 and 41 are compressed under a normal force of about 200 to 250 lbs. exerted by movable jaw 10 against the fixture of jaw 13. U-shaped bar spring 5 is deflected a distance of the order of about 5/16 in. which stores enough energy therein to power upper jaw 10 through a plurality of high-speed oscillatory reversals of diminishing amplitude — sufficient to cause interface melting between the overlapping strap portions 40 and 41. It is emphasized that this is only an example, since the amount of deflection required to cause melting is also a function of the compression force being applied, and the two can be varied accordingly. For instance, when a relatively thinner polypropylene strap is used, the normal force can be about 300 lbs. Further, it is noted that the melting point for different thermoplastic strap materials varies. For example, the melting point of nylon strap material is considerably higher than polypropylene. Therefore, the necessary compression force as well as the deflection will also vary according to the material used.

Trailing end 25 of upper jaw 10 preferably is provided with cutter blade 12 that protrudes outwardly from gripping surface 11. As upper gripping surface 11 is brought down towards compressing engagement with lower gripping surface 14, cutter blade 12 makes an incision in the surface of the overlapping strap portion 41 adjacent it, although it does not completely sever the strap portion. During the sealing operation, when jaws 10 and 13 are oscillated with respect to each other, the interface melting of the strap portion adjacent to the incision will sometimes cause cutter blade 12 to sever the overlapping strap portion 41. Where it does not, however, the strap may be subsequently cut off by grasping the remaining free end of the strapping material and pulling it upwardly against the cutter blade 12 with a slight twisting motion.

After the friction-fused joint in the overlapping strap portions 40 and 41 has been formed, operating handle 60 is moved in the opposite direction back to the starting position. In order to do this in instances where the trigger cam means is integral with handle 60, handle 60 is pulled rearwardly and upwardly so that pin 61 slides into the upper end of slots 63 and 64. In this manner trigger cam 71 on the end of the handle 60 is elevated with respect to vibratory end 8 so that as the operating handle 60 is swung in reverse direction about the pin 61, trigger cam 71 will clear the top of the vibratory end 8 as it passes thereover. Spring 67 will automatically pull pin 61 back to the lower or bottom end of slots 63 and 64. As operating handle 60 is returned to the start position (FIGS. 4 and 5), lifter cam 70 on handle 60 re-engages detent 79 in lift arm 75. This, in turn, pivots lift arm 75 counterclockwise about pin 76 bringing lower end 80 in engagement with vibratory end 8. Upper jaw 10 is then raised causing gripping surfaces 11 and 14 to move away from one another. The tool is removed from the sealed strap loop by rotating so as to remove the strap material from strap guide 15 through slot 30 on the side of base 1.

The operation of the manual strapping tool through a complete tensioning and sealing cycle will now be described. In FIGS. 9 and 10, the tool having flat bottom 2 is shown seated atop article P which is to be strapped. The strapping operation is begun with operating handle 60 in the start position where detent or lifter cam 70 on handle 60 engages pivotally-mounted lift arm 75 which raises the vibratory end 8, thereby separating the normally engaged gripping surfaces 11 and 14 of jaws 10 and 13 and storing return energy in the U-shaped bar spring 5.

An end of thermoplastic strapping material 40 is placed in strap guide 15 through slot 30 of the tool for engagement by the rear gripping mechanism 16. The operator, by depressing control lever 17 of mechanism 16 raises the gripping surface 20 from engagement with the surface portion 23 of the strap guide 15. The strap material 40 can then be placed in the guide under the raised gripping surface 20 onward between the separated gripping surfaces 11 and 14 of jaws 10 and 13 and stopping a short distance thereafter. The control lever 17 is then released allowing the gripping surface 20 to move downwardly under the pressure exerted by spring 21 to engage and securely hold the strap material 40 in position against the surface portion 23. The strap material 40 is then wrapped around the article P and placed in the strap guide 15 from the front of the tool passing over the top of the underlying strap material 40. The top strap, referred to as 41, is extended directly over the underlying strap 40 between the separated gripping surfaces 11 and 14, over the top of rear gripping surface 20 and lower arm 19, and out the rear of the tool extending directly under the operating handle 60.

The operator manually tensions the strapping material around the article P by grasping the handle grip 4 on the tool to hold it stationary and pulling the strapping material 41 parallel to the flat bottom 2 to the desired tension. With the desired tension being maintained, the operator lifts the top strap 41 upwardly so that it engages end 73 of the operating handle 60 moving handle 60 upwardly until lifter cam 70 disengages from the detent 79 in the lift arm 75. This releases the raised vibratory end 8 which then moves upper jaw 10 downwardly, compressing the overlapping strap portions 40 and 41 between the gripping surfaces 11 and 14. The downwardly acting force exerted by the vibratory end 8 is sufficient to hold top strap 41 under the pulled tension.

The operator can now release his hold on top strap 41 and move the operating handle forward about pin 61 to the strap sealing position. As operating handle 60 is pivoted about pin 61, trigger cam 71 on the end of operating handle 60 engages the upper right hand corner 90 of vibratory end 8, slowly deflecting it in a direction generally parallel to the strap gripping surfaces 11 and 14. The surface of the passing trigger cam 71 is designed to release vibratory end 8 after it has been deflected a distance sufficient to store a predetermined amount of energy in U-shaped bar spring 5. On release, upper jaw 10 connected to vibratory end 8 oscillates back and forth over lower jaw 13. The gripping surfaces 11 and 14 hold the adjacent overlapping strap portions 40 and 41 secure to jaws 10 and 13 so that the oscillation induces relative sliding frictional movement therebetween. The energy stored in U-shaped spring 5 powers the upper jaw 10 through a sufficient number of amplitude-diminishing oscillatory reversals to cause the interface regions of the compressed overlapping strap portions 40 and 41 to melt.

After movement of upper jaw 10 stops, the melted interface regions resolidify to form a friction-fused joint between the overlapping strap portions 40 and 41. Cutter blade 12 extending downwardly from the gripping surface 11 of the upper jaw 10 severs the top strap 41 at the end of the joint. The severing operation is facilitated by the operator pulling upwardly on the free end of top strap 41 with a twisting motion against cutter blade 12. By positioning cutter blade 12 on gripping surface 11, the cut end of the top strap 41 can be securely joined to the underlying strap 40. This eliminates any outwardly exposed loose end extending from the joint that could be snagged causing the joint to unintentionally be peeled open. By extending the underlying strap 40 outside jaws 10 and 13, an inner loose end is intentionally created for use in opening the friction-fused joint. This loose end is protected from snagging by the article on the one side and the top strap 41 on the other side. The joint can be opened from the loose end by manually rotating the joint until the loose end is exposed, grasping the loose end, and pulling the joint apart.

The friction-fused joint is now formed and the operating handle 60 is returned to the start position by pulling it rearwardly and upwardly and causing pin 61 to slide upward in slot 63 and 64. This allows trigger cam 71 to clear the top of the right corner 90 of the vibratory end 8 while operating handle 60 is pivoted backwards through the sealing and compressing positions, and into the starting position. There, lifter cam 70 engages detent 79 in lift arm 75 causing it to pivot about pin 76 and engage vibratory end 8. This raises jaw 10 and separates gripping surfaces 11 and 14. Control lever 17 is depressed thereby raising gripping surface 20 from clamping engagement of the underlying strap portion 40 and by rotating the tool to remove the strap material from the tool through elongated slot 30.

Another embodiment of the present invention, utilizing a rotatable trigger cam means rather than a trigger cam means integral with the operating handle, is illustrated in FIGS. 11 through 20.

Referring to FIGS. 11, 12 and 13, operating handle 95 is provided with bifurcated end 96 within which is rotatably mounted trigger cam 97. Operating handle 95 is pivotally mounted on the base member of the strapping tool by means of through pin 98 in a manner similar to operating handle 60 which utilizes pin 61 (FIG. 7). However, in this particular embodiment through pin 98 also serves to carry rotatable trigger cam 97 so that the pivot axis of handle 95 and the rotational axis of trigger cam 97 are coaxial.

Rotatable trigger cam 97 is oblong in configuration and is provided with a pair of substantially identical cam surfaces 99 and 100 that are off-set relative to one another and spaced about 180 degrees apart (FIG. 12). Trigger cam 97 is also provided with similarly positioned abutment surfaces 101 and 102 so that abutment surface 101 is opposite to cam surface 99 and abutment surface 102 is opposite to cam surface 100. Opposed lateral cam faces 103 and 104 are substantially parallel to one another and face the corresponding inner faces 105 and 106 of bifurcated end 96 of operating handle 95. Transverse through openings 107 and 108 are provided in trigger cam 97 substantially normal to lateral cam faces 103 and 104 and are positioned on opposite sides of pin 98 and substantially equidistant from the axis of rotation of trigger cam 97. Similar through openings or apertures 109 and 110 are provided in opposed legs 111 and 112 of bifurcated end 96 inwardly of pin 98. Trigger cam 97 is positioned between opposed legs 111 and 112 so that the innermost transverse through opening thereof is in substantial registry with through openings or apertures 109 and 110 in end 96 of operating handle 95 when handle 95 is in the start position. That is, when handle 95 is in the position shown in FIG. 12, transverse through opening 107 in trigger cam 97 is in registry with through openings or apertures 109 and 110.

Paired, outwardly-biased pawls 113 and 114 are slidably positioned within through opening 107 and engage legs 111 and 112 by extending into respective apertures 109 and 110 as shown in FIG. 13. Outwardly bias to pawls 113 and 114 is provided by coil spring 115. A similar set of outwardly-biased pawls, i.e., pawls 116 and 117, is provided in transverse through opening 108.

Preferably the pawls have a configuration of the type illustrated by pawl 113 in FIG. 14. Pawl 113 is provided with an outer, sloping camming face 118 which is adapted to coact with through opening or aperture 109 so that when handle 95 is pivoted from the strap sealing position back to the start position the inner wall of aperture 109 slides along camming face 118 and pushes pawl 113 into transverse through opening 107 against the urging of coil spring 115. On the other hand, when handle 95 is pivoted from the start position to the strap sealing position during an operational stroke, the inner wall of aperture 109 abuts bottom surface 119 of pawl 113 and the inner wall of aperture 110 abuts a similar bottom surface of pawl 114 as shown in FIG. 13, and rotates trigger cam 97 about the axis of pin 98 as a result. Pawl 113 is also provided with central recess 120 for receiving one end of spring 115. Pawl 114 is similarly constructed.

The operation of a manual strapping tool equipped with a rotatable trigger cam means is illustrated in FIGS. 15 through 20.

Referring to FIGS. 15 and 16, operating handle 95 is in the starting position and pawls 113 and 114 extend into through openings 109 and 110, respectively, in response to urging by coil spring 115. Opposed, paired pawls 116 and 117, on the other hand, are pushed within opening 108 by the action of opposed legs 111 and 112. Trigger cam surface 100 is spaced from vibrating free end 121 of a cantilevered bar spring which is similar to vibrating end 8 of cantilevered spring 5 illustrated in FIGS. 1 through 10. Abutment surface 101 is positioned adjacent to and immediately above vibrating free end 121. As handle 95 is pivoted in a clockwise direction during an operational stroke, trigger cam 97 rotates with handle 95 because pawls 113 and 114 lock handle 95 and trigger cam 97 together. During rotation to the sealing position indicated by FIGS. 17 and 18 cam surface 100 approaches, deflects and subsequently releases vibrating end 121 the resulting oscillations of which effect the desired friction fusion of the strap in the manner described in detail hereinabove.

When handle 95 reaches the strap sealing position cam surface 100 has been rotated 180 degrees about the longitudinal axis of pin 98 and cam surface 99 now occupies the position occupied by cam surface 100 at the time in the sealing cycle when the clockwise pivot movement of handle 95 began. Also, now abutment surface 102 is positioned immediately above vibrating end 121.

During the return stroke of handle 95 abutment surface 102 abuts vibrating end 121 thereby preventing counterclockwise rotation of trigger cam 97 and causing disengagement of pawls 113 and 114 from respective through openings 109 and 110 so that during the return stroke of handle 95 both pairs of opposed pawls are disengaged as shown in FIG. 20. However, once the return stroke of handle 95 is completed, through openings 109 and 110 are in registry with respective pawls 117 and 116 which pawls engage openings 109 and 110 in response to the urging of a coil spring positioned therebetween and thus prepare the strapping tool for the next sealing cycle. During each successive sealing cycle trigger cam 97 is rotated about 180 degrees and cam surfaces 99 and 100 alternate in deflecting and releasing vibrating free end 121.

Thus, while preferred constructional features of the present invention are embodied in the structure illustrated herein, it is to be understood that changes and variations may be made by those skilled in the art without departing from the spirit and scope of the invention. For example, other trigger cam configurations or pawl configurations can be utilized. Also, instead of manual tensioning of the strap while placed in the tool, motor driven strap tensioning means which provide a higher tensioning capability may be utilized in conjunction with the strap joining means disclosed hereinabove.

What is claimed is:

1. Apparatus for joining a pair of overlapping portions of a thermoplastic strap, comprising: a base member; a cantilevered bar spring member having a vibratory end and a fixed end rigidly anchored to said base member; means mounted on said base member for deflecting and releasing said vibratory end; a fixed gripper jaw positioned on said base member to engage one of said overlapping portions; a movable gripper jaw on said vibratory end and in juxtaposition to said fixed gripper jaw to engage the other of said overlapping portions; jaw release means on said base member for spacing said gripper jaws; said gripper jaws being adapted to receive said overlapping strap portions therebetween and to urge the received strap portions against one another, and said bar spring member upon release after a deflection causing sliding and oscillating frictional movement of one received strap portion relative to the other received strap portion sufficient to melt an interface region of said strap portions.

2. Apparatus according to claim 1, wherein said means for deflecting and releasing said vibrator end is an operating handle pivotally mounted on said base member and having an integral trigger cam means formed on said handle.

3. Apparatus according to claim 1, wherein said means for deflecting and releasing said vibratory end is an operating handle pivotally mounted on said base member and operably associated with a rotatable, pawl-actuated trigger cam means having a pair of substantially identical cam surfaces spaced about 180 degrees apart.

4. Apparatus according to claim 1, wherein said jaw release means includes a lift arm pivotally mounted on said base member, and wherein an operating handle is pivotally mounted on said base member and is provided with a detent cam; said lift arm having a detent means in the surface thereof engageable by said detent cam, said operating handle being pivotally movable to a selected position where said detent cam engages said detent means and pivots said lift arm into engagement with said vibratory end causing said gripper jaws to be moved apart.

5. Apparatus according to claim 1, wherein said fixed gripper jaw comprises a lower jaw having an upwardly facing strap gripping surface, and said movable gripper jaw comprises an upper jaw having a downwardly facing strap gripping surface.

6. Apparatus according to claim 5, wherein the upper jaw of said strap gripping surfaces has an integral strap cutting blade projecting therefrom.

7. Apparatus according to claim 6, wherein said cutting blade projects downwardly from said downwardly facing strap gripping surface.

8. Apparatus for joining a pair of overlapping portions of a thermoplastic strap, comprising: a base member; a cantilevered spring member having a vibratory end and a fixed end rigidly anchored to said base member; means mounted on said base member for deflecting and releasing said vibratory end; a fixed gripper jaw positioned on said base member and provided with an upwardly facing strap gripping surface adapted to engage one of said overlapping portions; a movable gripper jaw on said vibratory end, in juxtaposition to said fixed gripper jaw and provided with a downwardly facing strap gripping surface adapted to engage the other of said overlapping portions; and jaw release means on said base member for spacing said gripper jaws; said fixed end being mounted on said base at an acute angle with respect to the upwardly facing strap gripping surface and so that said vibratory end projects downwardly towards said upwardly facing gripping surface and urges said downwarldy facing gripping surface towards engagement with said upwardly facing gripping surface; said gripper jaws being adapted to receive said overlapping strap portions therebetween and to urge the received strap portions against one another; and said spring member upon release after a deflection causing sliding frictional movement of one received strap portion relative to the other sufficient to melt an interface region of said strap portions.

9. Apparatus according to claim 8, wherein an adjusting means is provided on said base member for adjusting the angle of said fixed end with respect to the upwardly facing gripping surface.

10. Apparatus for joining a pair of overlapping portions of a thermoplastic strap, comprising: a base member provided with an upwardly extending yoke having opposed slots; a cantilevered spring member having a generally U-shaped configuration, a vibratory end, and a fixed end rigidly anchored to said base member; an operating handle pivotally mounted on said base member by a pin extending transversely through the handle and received at pin ends in said slots and supported by said yoke, the handle being provided with trigger cam means for deflecting and releasing said vibratory end when the handle is pivoted; a fixed gripper jaw positioned on said base member to engage one of said overlapping portions; a movable gripper jaw on said vibratory end and in juxtaposition to said fixed gripper jaw to engage the other of said overlapping portions; jaw release means on said base member for spacing said gripper jaws; said gripper jaws being adapted to receive said overlapping strap portions therebetween and to urge the received strap portions against one another, said operating handle being pivotable with said pin positioned at one end of said slots to cause said trigger cam means to deflect and release said vibratory end and being pivotable with said pin positioned at the other end of said slots to allow said trigger cam means to pass said vibratory end without contacting it; and said spring member upon release after a deflection causing sliding frictional movement of one received strap portion relative to the other sufficient to melt an interface region of said strap portions.

11. Apparatus for tensioning and joining a pair of overlapping portions of a thermoplastic strap disposed in tension about a package, comprising: a base member; a cantilevered spring member having a vibratory end and a fixed end rigidly anchored to said base member, means pivotally mounted on said base member for deflecting and releasing said vibratory end; means on said base member for retaining one of the overlapping portions in position relative to the package whereby the other overlapping portion can be acted on to form a tensioned loop about the package, a fixed gripper jaw positioned on said base member to engage one of said overlapping portions; a movable gripper jaw on said vibratory end and in juxtaposition to said fixed gripper jaw to engage the other of said overlapping portions; jaw release means on said base member for spacing said gripper jaws; said gripper jaws being adapted to receive said overlapping strap portions therebetween and to urge the received strap portions against one another, and said spring member upon release after a deflection causing sliding frictional movement of the received strap portions relative to one another sufficient to melt an interface region of said strap portions.

12. Apparatus for joining overlapping portions of a thermoplastic strap, comprising: a base, a cantilevered spring having a vibratory end and a fixed end; said fixed end being rigidly anchored to said base; a pair of jaws having complementary opposing strap gripping surfaces; one of the jaws being fixedly positioned on said base, the other jaw being attached to said vibratory end such that the strap gripping surface thereof is urged into engagement with the strap gripping surface of the fixed jaw; an operating handle pivotally mounted on said base having a lifter cam and a trigger cam, and being swingable through an arc from a start position sequentially through a strap compressing position and a strap sealing position; a lift arm pivotally mounted on said base, said lift arm having a detent therein engageable by the lifter cam on said operating handle when in the start position to pivot said lift arm into engagement with said vibratory end causing said gripping surfaces to be separated; said gripping surfaces when separated being adapted to receive overlapping strap portions therebetween; said operating handle, when moved from the start position into the strap compressing position, causing the lifter cam on said operating handle to disengage the detent on the lift arm releasing the vibratory end and allowing the gripping surfaces to compressingly engage the overlapping strap portions; said operating handle when further moved from the strap compressing position to the strap sealing position, bringing the trigger cam on said operating handle into engagement with said vibratory end; and further movement of said operating handle through said strap sealing position causing the trigger cam to deflect said vibratory end in a direction generally parallel to said strap gripping surfaces a distance sufficient to store a predetermined amount of energy in said cantilevered spring, and subsequently causing the trigger cam to release said vibratory end and permitting said gripping surfaces to oscillate with respect to each other so as to induce sliding frictional movement between the compressed overlapping strap portions sufficient to melt an interface region therebetween.

13. Apparatus for joining a pair of overlapping portions of a thermoplastic strap which comprises a base member provided with an upwardly extending yoke; a cantilevered spring member of a generally U-shaped configuration, having a vibratory end and a fixed end, and rigidly mounted on said base member at said fixed end; an operating handle having a bifurcated end portion comprising a pair of opposed legs and pivotally mounted on said yoke by means of a pin extending transversely through said opposed legs; a rotatable trigger cam means positioned between said opposed legs, rotatably mounted on said pin, having a pair of substantially identical but off-set cam surfaces spaced about 180 degrees apart, and a pair of opposed lateral faces provided with a pair of transverse through openings normal to the lateral faces and positioned substantially equidistant from the axis of rotation of said cam member; and paired opposed, outwardly-biased pawls slidably positioned within each of said through openings; said opposed legs of the bifurcated end portion being provided with opposed, substantially aligned apertures in registry with one of said through openings in the trigger cam means for receiving therein one set of said paired pawls during an operational stroke of said operating handle.

14. Apparatus according to claim 13 wherein said rotatable trigger cam means is further provided with a pair of off-set abutment surfaces spaced about 180° apart and adjacent to said cam surfaces.

15. Apparatus according to claim 13 wherein said substantially aligned apertures in the opposed legs are positioned inwardly of said pin.

16. A method for joining overlapping portions of a thermoplastic strap, comprising the steps of: gripping and compressing the overlapping strap portions between opposing strap gripping surfaces of a pair of jaws, one of the jaws being fixedly mounted on a base, the other jaw being attached to a vibratory end of a cantilevered bar spring anchored to the base so that the spring urges one gripped strap portion against the other gripped strap portion; deflecting the vibratory end to store a predetermined amount of energy in said bar spring; and releasing the vibratory end of said cantilevered bar spring to effect relative oscillatory movement between said gripped strap portions to cause oscillating and sliding frictional movement between said compressed overlapping strap portions sufficient to melt the interface regions thereof.

17. The method according to claim 16 wherein the vibratory end is deflected a predetermined distance in a direction generally parallel to the strap gripping surfaces.

18. A method for forming a tensioned loop about a package and joining overlapping portions of a thermoplastic strap, comprising the steps of: forming a tensioned loop about a package, gripping and compressing the overlapping strap portions between opposing strap gripping surfaces of a pair of jaws, one of the jaws being fixedly mounted on a base, the other jaw being attached to a vibratory end of a cantilevered spring anchored to the base so that the spring urges one gripping surface towards the other; deflecting the vibratory end to store a predetermined amount of energy in said spring; and, releasing the vibratory end of the cantilevered spring to effect relative oscillatory movement between said strap gripping surfaces to cause sliding frictional movement between said compressed overlapping strap portions sufficient to melt the interface regions thereof.

19. The method as set forth in claim 18 including the step of moving the strap upwardly after it is tensioned to effect positioning of the vibratory end to compress the overlapping strap portions.

* * * * *